(12) United States Patent
Armaly, Jr.

(10) Patent No.: US 7,418,761 B2
(45) Date of Patent: Sep. 2, 2008

(54) GRILLE CLEANING SPONGE

(76) Inventor: John W. Armaly, Jr., 1900 Easy St., Walled Lake, MI (US) 48390

( * ) Notice: Subject to any disclaimer, the term of this patent is extended or adjusted under 35 U.S.C. 154(b) by 450 days.

(21) Appl. No.: 11/114,482

(22) Filed: Apr. 26, 2005

(65) Prior Publication Data

US 2006/0083913 A1 Apr. 20, 2006

Related U.S. Application Data

(63) Continuation-in-part of application No. 29/215,258, filed on Oct. 15, 2004, now Pat. No. Des. 506,587.

(51) Int. Cl.
*A47L 13/16* (2006.01)
(52) U.S. Cl. .................. 15/244.4; 15/244.1; D32/40
(58) Field of Classification Search .................. 15/244, 15/1, 244.4; D32/40
See application file for complete search history.

(56) References Cited

U.S. PATENT DOCUMENTS 4,866,806 A * 9/1989 Bedford .................... 15/104.94
5,640,737 A * 6/1997 Boggs ......................... 15/118

FOREIGN PATENT DOCUMENTS

JP 2004-073678 * 3/2004
JP 2004-275687 * 10/2004

* cited by examiner

*Primary Examiner*—Ana L Woodward
(74) *Attorney, Agent, or Firm*—The Weintraub Group, PLC

(57) ABSTRACT

A sponge for cleaning a vehicular grille has a multilayered polyester polyol-based polyurethane wherein the upper and lower layers are each a flexible polyester polyurethane foam and the central or medial layer is a reticulated polyurethane foam. The layers are bonded together. The sponge has a first serrated side edge and an opposed semicircular side edge enabling at least one edges to be inserted into the interstices of an automotive grille.

5 Claims, 2 Drawing Sheets

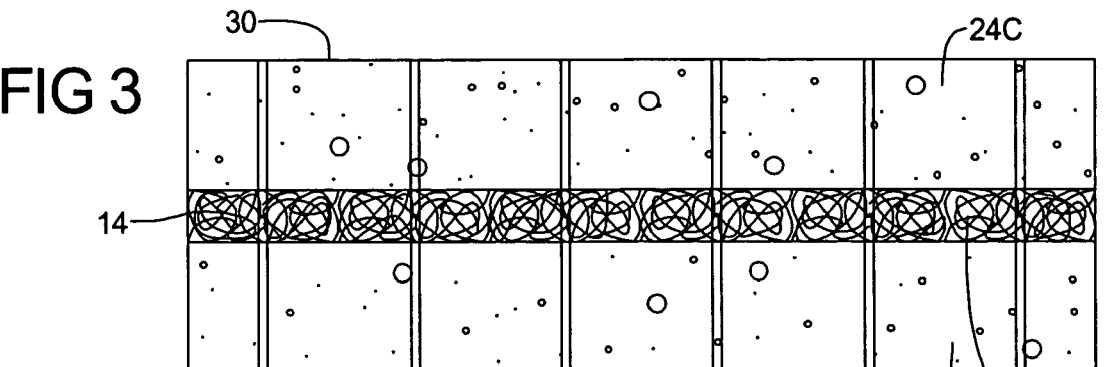
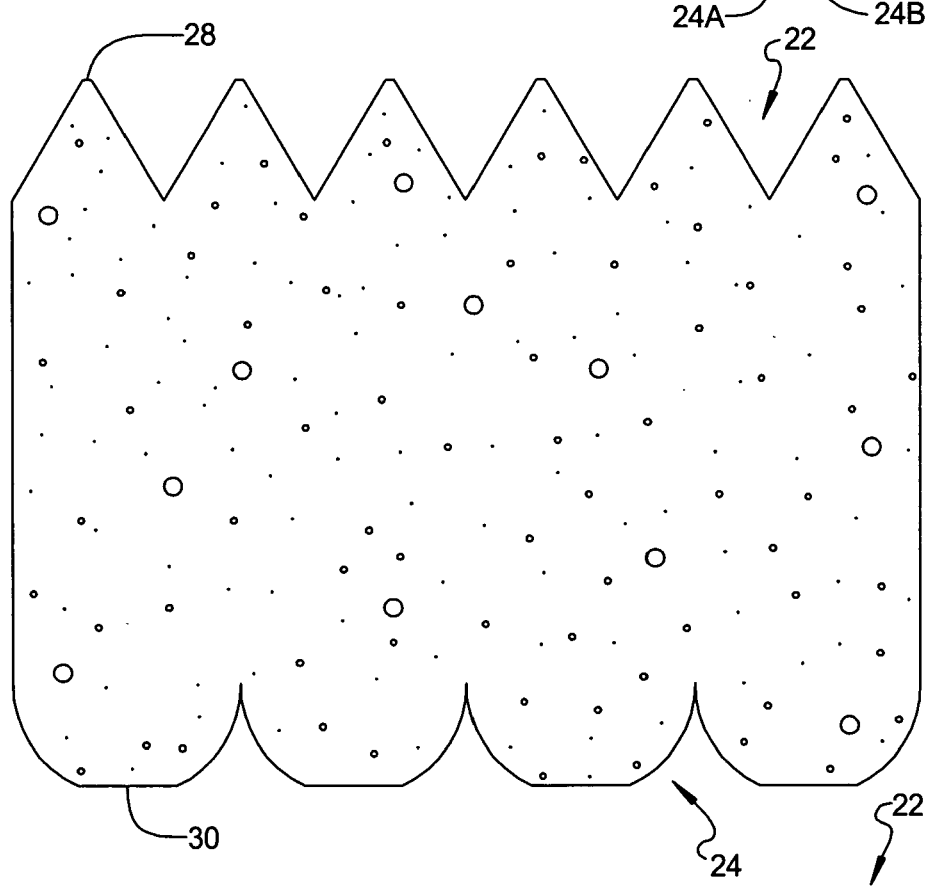
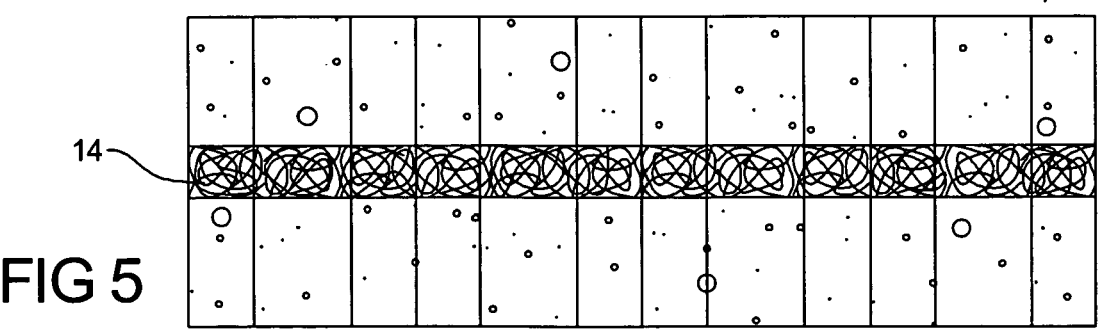

GRILLE CLEANING SPONGE

CROSS REFERENCE TO RELATED APPLICATIONS

This application is a continuation-in-part application of U.S. patent application Ser. No. 29/215,258 filed Oct. 15, 2004, now U.S. Pat. No. D,506,587, for "Grille Cleaning Sponge", the disclosure of which is hereby incorporated by reference.

BACKGROUND OF THE INVENTION

The present invention pertains to sponges. More particularly, the present invention pertains to sponges having foraminous upper and lower layers with a reticulated medial central portion. Even more particularly, the present invention concerns sponges of the type herein indicated which are particularly adapted for cleaning the grille of a vehicle.

PRIOR ART

As is known to those skilled in the art to which the present invention pertains there exists a multitude of art directed to various sponges and other materials for cleaning a variety of surfaces.

For example, U.S. Pat. Nos. 3,570,036; 4,866,806; 5,640,737; D300,478 as well as French Patent No. 2046970; Japanese Patent No. 2004073678 and Australian Patent No. 124579 all teach various configurations for sponges each comprising a multi-layered article for achieving various purposes. However, it is clear from a review of the prior art that none teaches the accommodation of both a serrated side edge and an opposite arcuate side edge for accommodating various openings and configurations of automotive grilles. It is to this to which the present invention is directed.

SUMMARY OF THE INVENTION

The present invention provides a sponge for use in cleaning grilles and, in particular, automotive grilles and which generally comprises: a multi-layered member having, (a) an upper foraminous layer or element, (b) a reticulated central layer or element and (c) a foraminous lower layer or element. The elements are adhered together by any suitable means, such as by an adhesive, heat curing or the like.

Preferably, each layer comprises a polyurethane and, in particular, a polyester polyol-based polyurethane.

Each of the layers have coincident side edges, a first side edge being substantially serrated and the opposed or opposite side edge being substantially semi-circular or arcuate.

For a more complete understanding of the present invention, reference is made to the following detail description and accompanying drawing. In the drawing like reference characters refer to like parts throughout the several views in which:

BRIEF DESCRIPTION OF THE DRAWING

FIG. 3 is a first side view plan from the side opposite that of FIG. 2 view of the sponge hereof;

FIG. 4 is a bottom view of the sponge hereof, and

FIG. 5 is a second side plan view hereof, as seen from the side opposite that of FIG. 3.

DESCRIPTION OF THE PREFERRED EMBODIMENT

Figure 1:
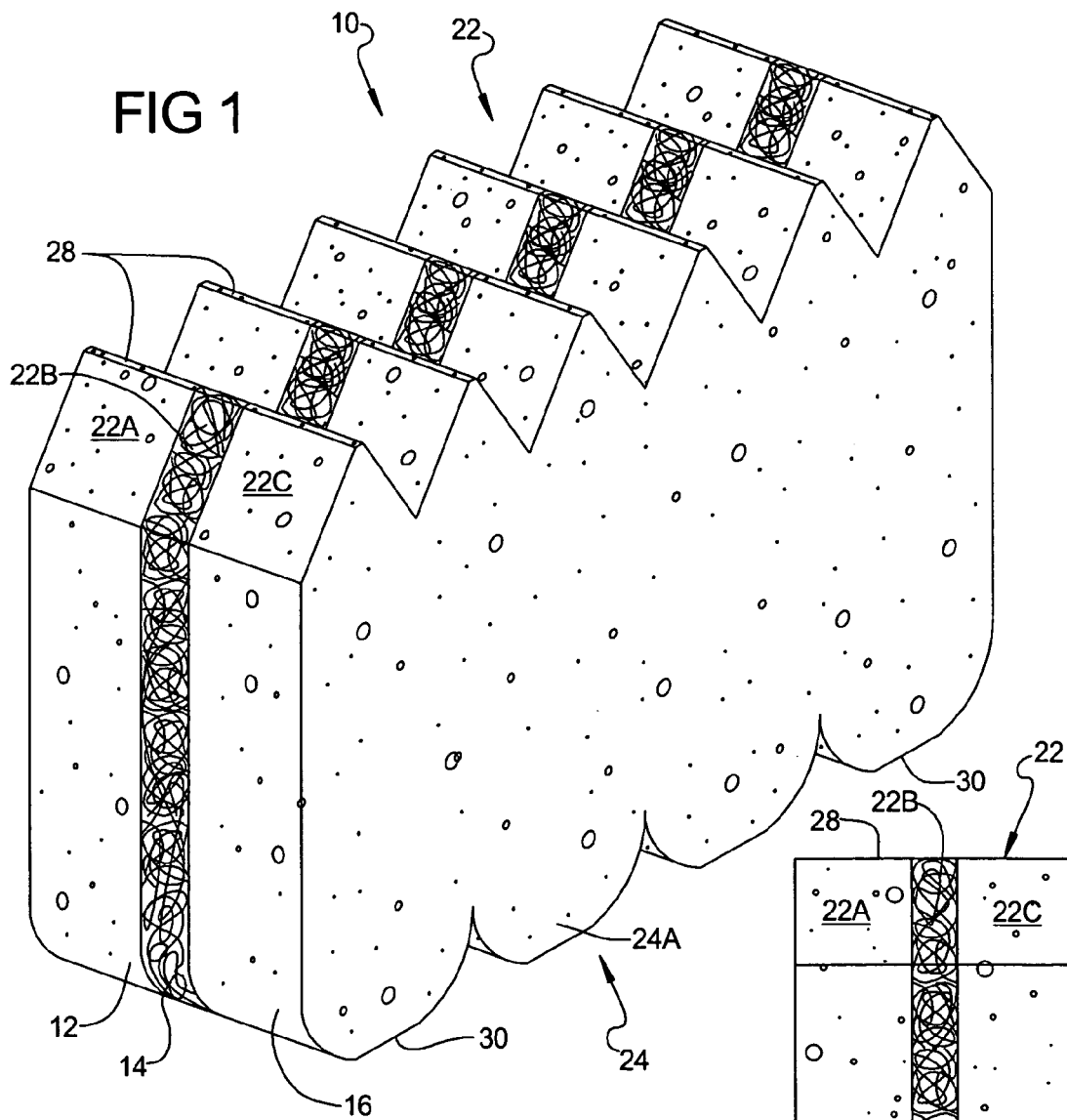
FIG. 1 is a perspective view of a sponge in accordance with the present invention.
Figure 2:
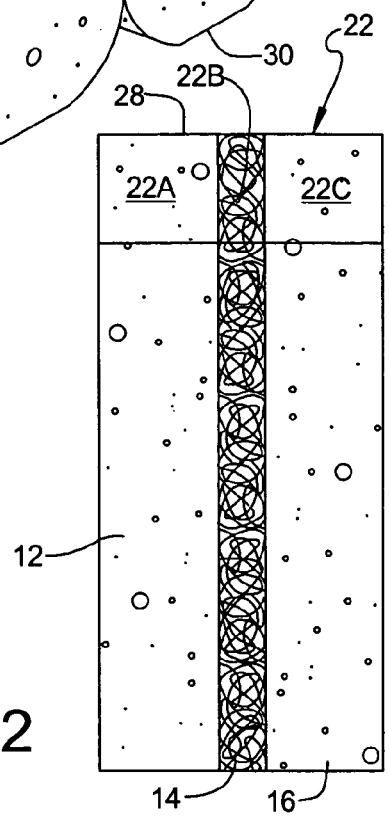
FIG. 2 is an end view of the sponge hereof.

Now, in accordance with the present invention, and with reference to the drawing, there is depicted therein a sponge, generally, denoted at 10, which is particularly adapted for cleaning the grille of a vehicle. The sponge hereof enables the insertion of portions thereof in between the interstices or openings in order to effectively and sufficiently clean the entire grille.

The sponge 10 hereof, and as shown in the drawing, comprises a first or upper layer 12, a central or medial layer 14 and a lower or bottom layer 16. The upper layer 12 and the lower layer 16, respectively, preferably, comprise the same material. The central portion 14, while being formed of the same material, has a different structure.

More particularly, the upper and lower layers 12,16 are each an open-celled polyester-polyol based polyurethane foam, each formed under conventional foaming conditions. The medial or central layer 16 is a reticulated polyester-polyol polyurethane. By reticulating the central layer an open network of rigid surfaces are presented for sufficient scrubbing of the grille.

In manufacturing the foam hereof the reticulated medial or central portion is sandwiched between the upper and lower layers and is adhered thereto by any conventional means, such as, with a suitable adhesive, by heat melt or the like. As shown in the drawing each layer has a first side edge 22A, 22B and 22C, respectively, and an opposite side edge 24A, 24B and 24C. When the layers are superposed, the side edges are arrayed to be coincident.

Thus, the sponge 10 has first and second side edges 22 and 24. The first side edge 22 is serrated or toothed. The opposed or opposite side edge 24 is a substantially semi-circular or arcuate side edge. The side edges 22 and 24 can protrude or project into the interstices of the grille, depending on its configuration. Each serration and arcuate element of these side edges is provided with a flattened top 28, 30 as shown, to prevent scratching, or the like. This is particularly shown in FIG. 4 hereof.

As noted hereinabove the foams are polyester polyol-based polyurethane foams which are prepared under conventional conditions. As is known to those skilled in the art to which the present invention pertains, flexible polyurethane foams prepared from polyester polyols typically involve the reaction of the polyester polyol with a suitable polyisocyanate which is then blown to form the requisite foam. Suitable foaming agents may also be incorporated thereinto.

The actual manufacture of these foams is well known in the art. For example, in U.S. Pat. Nos. 6,841,586 and 6,855,741, the disclosures of which are hereby incorporated by referring there is disclosed therein the manufacture of polyester polyol-based polyurethane foams. Typically, these foams utilize suitable polyester polyols such as those produced by reacting a dicarboxylic and/or monocarboxylic acid with an excess of a diol and/or polyhydroxy alcohol, for example, adipic acid, glutaric acid, succinic acid, phthalic acid or anhydride, and/or fatty acids (linolic acid, oleic acid and the like) with diethylene glycol, ethylene glycol, propylene glycol, dipropylene glycol, 1,4-butanediol, neopentyl glycol, trimethylolpropane, trimethylolethane, and/or pentaerythritol. Examples of these polyols are LEXOREZ 1102-50 or LEXOREZ 1102-60 from Inolex Chemical Company or FOMREZ 50 or FOMREZ 60 from Crompton Corporation. Other suitable polyester polyols can be prepared by reacting a lactone with an excess of a diol such as caprolactone with propylene glycol. See U.S. Pat. No.

4,331,555 for further discussion of suitable polyester polyols, the disclosure of which is hereby incorporated by reference.

Generally, however, these polyester polyurethane foams are prepared from the reaction of a hydrophilic polyester polyol and a polyisocyate. Hydrophilic ester polyols are typically reaction products of polyethylene glycol and adipic acid. Examples are FOMREZ 45 from Crompton and LEXOREZ 1105-HV2 from Inolex Chemical Company.

The "hydroxyl number" for a polyol is a measure of the amount of reactive hydroxyl groups available for reaction. The value is reported as the number of milligrams of potassium hydroxide equivalent to the hydroxyl groups found in one gram of the sample. "Functionality" of a polyol is defined as the average number of hydroxyl group sites per molecule. Preferably, the polyester polyols ordinarily used to form the foams have a hydroxyl number in the range of 20 to 150, more preferably, in the range of 40 to 100, and most preferably in the range of 50 to 60.

The term "polyisocyanate" refers particularly to isocyanates that have previously been suggested for use in preparing polyurethane foams. "Polyisocyanates" include di- and polyisocyanates and prepolymers of polyols and polyisocyanates having excess isocyanate groups available to react with additional polyol. The amount of polyisocyanate employed is frequently expressed by the term "index", which refers to the actual amount of isocyanate required for reaction with all of the active hydrogen-containing compounds present in the reaction mixture multiplied by 100. For most foam applications, the isocyanate index is in the range of between about 75 to 140.

The polyester polyurethane foams are prepared using any suitable organic polyisocyanates well known in the art including, for example, hexamethylene diisocyanate, phenylene diisocyanate, toluene diisocyanate (TDI) and 4,4'-diphenylmethane diisocyanate (MDI). The methylene diisocyanates suitable for use are diphenyl methane diisocyanate and polymethylene polyphenyl isocyanate blends (sometimes referred to as "MDI" or "polymeric MDI"). The MDI blends can contain diphenylmethane 4,4' diisocyanate, as well as 2,2' and 2,4' isomers and higher molecular weight oligomers and have an isocyanate functionality of from about 2.1 to 2.7, preferably from about 2.1 to 2.5. Preferably, the isocyanate is selected from a commercial mixture of 2,4- and 2,6-toluene diisocyanate. A well-known commercial toluene diisocyanate is TD80, a blend of 80% 2,4 toluene diisocyanate and 20% 2,6 toluene diisocyanate. Polyisocyanates are typically used at a level of between 20 and 90 parts by weight per 100 parts of polyol, depending upon the polyol OH content and water content of the formulation.

One or more surfactants may also be employed in the foam-forming composition. The surfactants lower the bulk surface tension, promote nucleation of bubbles, stabilize the rising cellular structure, emulsify incompatible ingredients, and may have some effect on the hydrophilicity of the resulting foam. The surfactants typically used in polyurethane foam applications are polysiloxane-polyoxyalkylene copolymers, which are generally used at levels between about 0.5 and 3 parts by weight per 100 parts polyol. In the present invention, from 1.0 to 3.0 parts by weight per 100 parts polyol of surfactant is preferred. Surfactants, which may for example be organic or silicone based, such as FOMREZ M66-86A (Witco) and L532 (OSi Specialties) may be used to stabilize the cell structure, to act as emulsifiers and to assist in mixing. Most preferably, the surfactant is a cell opening silicone surfactant in an amount from 1.5 to 2.5 parts by weight per 100 parts polyol.

Catalysts are used to control the relative rates of water-polyisocyanate (gas-forming or blowing) and polyol-polyisocyanate (gelling) reactions. The catalyst may be a single component, or in most cases a mixture of two or more compounds. Preferred catalysts for polyurethane foam production are organotin salts and tertiary amines. The amine catalysts are known to have a greater effect on the water-polyisocyanate reaction, whereas the organotin catalysts are known to have a greater effect on the polyol-polyisocyanate reaction. The amount of catalyst used depends upon the formulation employed and the type of catalyst, as known to those skilled in the art.

Suitable urethane catalysts are all those well known to the worker skilled in the art, including tertiary amines such as triethylenediamine, N-methylimidazole, 1,2-dimethylimidazole, N-methylmorpholine, N-ethylmorpholine, triethylamine, tributylamine, triethanolamine, dimethylethanolamine and bisdimethylaminodiethylether, and organotins such as stannous octoate, stannous acetate, stannous oleate, stannous laurate, dibutyltin dilaurate and dibutyltin bis(2-ethylhexanoate), and other such tin salts. Other useful catalysts include tin 2-ethylcaproate, tin naphthoate, tin octylate and the like. These catalysts may be used singly or in combination, and it may be more effective to use an amine together with an organometallic compound or an organic acid salt of a metal. Catalysts should be present at about 0.0001 to about 5 weight percent of the reaction mixture.

Other useful amines which may be used as the catalyst in the present invention include, for example, trialkylamines, such as triethylene amine; N,N,N',N'-tetramethyl-1,3-butanediamine; amino alcohols such as dimethyl ethanolamine; ester amines such as ethoxylamine, ethoxyldiamine, bis-(diethylethanolamine)adipate; triethylenediamine; cyclohexylamine derivatives such as N,N-dimethylcyclohexylamine; morpholine derivative such as N-methylmorpholine; and piparazine derivatives such as N,N'-diethyl-2-methylpiparazine, N,N'-bis-(2-hydroxypropyl)-2-methylpiparazine, bis(2, 2'-dimethylaminoethyl)ether, and the like.

The catalysts, including 1,3,5-tris-(3-dimethylaminopropyl)-1,3,5-triazine, bis-(3-dimethylaminopropyl)methylamine, potassium acetate, potassium octoate, and DBU, and the methods of use of U.S. Pat. No. 5,539,011 are exemplary and are incorporated herein by reference.

Water is preferably the sole blowing agent to produce carbon dioxide by reaction with the isocyanate. Water is usually used at about 0.1 to about 10 parts per hundred parts of polyol, by weight (pphp), preferably between about 2 and about 8 pphp, more preferably between about 3 and about 6.5 pphp, most preferably between about 3.5 and about 5.8. At foam indexes below 100, the stoichiometric excess of water blows, via vaporization, and cools the foam, and does not take part of the reaction to produce carbon dioxide.

The use of water as the foaming agent in flexible polyurethane foams increases the firmness of the resulting foams. A soft, flexible, plasticized water-blown polyurethane foam composition can be produced from the reaction of a polyol and toluene diisocyanate by adding a plasticizer selected from the group of phthalates, phosphate esters and benzoates to the reaction compounds. The types of plasticizers used in this invention are described in U.S. Pat. No. 5,624,968, the disclosure of which is incorporated by reference herein.

Other blowing agents that are conventionally used in the art may be used herein, such as fluorocarbon compounds, including trichlorofluoromethane, methylene chloride, methyl chloroform, as well as acetone can be included. While the amount of inert blowing material may range from about 0 to about 30 pphp, commercially acceptable foams can generally be made using between about 0 and about 8 pphp, typically between about 0 and about 5 pphp, more typically between about 1 and about 3 pphp.

A double-cell structure may be created to replicate the appearance of natural sea sponges. Materials used to create a double cell structure may be added to the foam forming mixture. These include: castor oil derivatives, stearic acid, acetic acid and low melting point waxes. These materials create voids larger than the prevailing pores within the resulting foam structure. If used, the double-cell additive preferably is added in an amount from 0.04 to 0.21 parts per 100 parts polyol.

Plasticizers which may be used include phthalate plasticizers such as, for example, alkyl aryl phthalates, or alkyl benzyl phthalates, including butyl benzyl phthalate, alkyl benzyl phthalate, preferably wherein the alkyl group has a carbon chain of from seven to nine carbon atoms, Texanol.RTM. benzyl phthalate, (which is 2,2,4-trimethyl-1,3-pentanediol-monobutyrate benzyl phthalate), alkyl phenyl phthalate, symmetrical and unsymmetrical dialkyl phthalates including diisononyl phihalate, diisodecyl phthalate, dioctyl phthalate, Di-n-butyl phthalate, Dioctyl phthalate, dihexyl phthalate, diheptyl phthalate, butyloctyl phthalate, linear dialkyl phthalate wherein the alkyl groups are independently carbon chains having from seven to eleven carbon atoms, and butyl cyclohexyl phthalate; phosphate ester plasticizers such as, for example, 2-ethylhexyl diphenyl phosphate, isodecyl diphenyl phosphate, mixed dodecyl and tetradecyl diphenyl phosphate, trioctyl phosphate, tributyl phosphate, butylphenyl diphenyl phosphate and isopropylated triphenyl phosphate; and benzoate plasticizers such as, for example, Texanol.RTM. benzoate (which is 2,2,4-trimethyl-1,3-pentanediol-monobutyrate benzoate), glycol benzoate, propylene glycol dibenzoate, dipropylene glycol dibenzoate, and tripropylene glycol dibenzoates.

Also, crosslinker/extenders may be incorporated into the foam formulation. As used herein, the term "crosslinker" is meant to include both compounds generally known as crosslinkers and compounds generally known as chain extenders or simply extenders. Crosslinkers are compounds that contain two or more isocyanate-reactive groups, such as hydroxyl groups, primary amines, and secondary amines.

Effective chain extender or crosslinkers can be from the saccharides, which were found to be generally effective and a preferred class. This class includes sorbitol, sucrose, mannitol, ribose, xylitol, lactose, and fructose. Sorbitol and mannitol are more preferred. These compounds are not soluble in the plasticizer, but these are generally soluble in water and thus can be easily incorporated into the water-blown foam composition.

The polyamines, 4,4'-methylene-bis-(3-chloro-2,6-diethylaniline) (MCDEA) at 0.5 pphp, and amine terminated polyalkylene oxide such as JEFFAMINE.RTM. T-403 (Huntsman Co.) are effective. Also, alkanolamines such as triethanolamine, diethanolamine, triisopropanolamine, diisopropanolamine, t-butyltolylenediamine, triaminonane, diethyltolylenediamine, and chlorodiaminobenzene may be used.

Other materials can optionally be added to the polyurethane during production to reduce problems during production or to provide desired properties in the polyurethane product. Among the other additives are fillers including reground polyurethane foam, calcium carbonate, barium sulfate, and the like; UV stabilizers; fire retardants; bacteriostats; cell openers; dyes; and antistatic agents. It is also desirable to include stabilizers and antioxidants such as hindered amine light stabilizers and benzotriazoles.

A cell opening agent, such as a polyethylene oxide monol or polyol of an equivalent weight greater than about 200 with a hydroxyl functionality of two or greater, may be included. For example, one cell opening agent is a polyethylene oxide adduct of glycerol of a molecular weight of about 990 gms/mole, with an equivalent weight of about 330. The cell opening agent should be present at about 0.001 to about 20 phhp.

Solid stabilizing polymers and other additives, including flame retardants, colorants, dyes and anti-static agents, which are conventionally known in the art may be used with the formulations of the present invention. Those additives listed in U.S. Pat. No. 4,950,694 are exemplary and are incorporated herein by reference.

Other fillers and additives such as esters of aliphatic polyhydroxy compounds and unsaturated carboxylic acids may also be used. Examples are acrylates, such as ethylene glycol diacrylate; triethylene glycol diacrylate; tetramethylene glycol diacrylate; trimethylolpropane triacrylate; trimethylolethane triacrylate; pentaerythritol diacrylate; pentaerythritol triacrylate; pentaerythritol tetraacrylate; dipentaerythritol tetraacrylate; dipentaerythritol pentaacrylate; dipentaerythritol hexaacrylate; tripentaerythritol octaacrylate; glycerol diacrylate; methacrylates, such as triethylene glycol dimethacrylate; tetramethylene glycol dimethacrylate; trimethylolpropane trimethacrylate; trimethylolethane trimethacrylate; pentaerythritol dimethacrylate; pentaerythritol trimethacrylate; pentaerythritol tetramethacrylate; dipentaerythritol dimethacrylate; dipentaerythritol trimethacrylate; dipentaerythritol tetramethacrylate; tripentaerythritol octamethacrylate; ethylene glycol dimethacrylate; 1,4-butanediol dimethacrylate; sorbitol tetramethacrylate and the like; itaconates, such as ethylene glycol diitaconate; propylene glycol diitaconate; 1,2-butanediol diitaconate; tetramethylene glycol diitaconate; pentaerythritol triitaconate and the like; crotonates such as ethylene glycol dicrotonate; diethylene glycol dicrotonate; pentaerythritol tetracrotonate and the like; and maleates, such as ethylene glycol dimaleate; triethylene glycol dimaleate; pentaerythritol dimaleate and the like.

An anti-oxidant, such as a hindered phenolic, i.e., IRGANOX.RTM. 1010 (Ciba-Geigy), an organic phosphite, or both, may be added to the composition containing the plasticizer. Stabilizers such as tetrabutylhexamethylenediamine are also beneficially added.

The crosslinker/extender additive beneficially improves the integrity of low index foams; meanwhile, the plasticizer would provide good "hand" and physical properties along with improvements to airflow and rebound properties.

It should be noted with respect hereto that in forming the reticulated foam, reticulation is carried out in accordance with practices well know to the skilled artisan. Typically, a slow melt is carried out in the presence of a suitable reticulating agents such as dimethylsulfoxite, dimethylacetmide, formamide, dimethylformamide, II-pyrrolidone and I-methyl II-pyrrolidone. These reticulating agents cause a controlled melting of the sponge material during the freeze drying process.

In any event, though, each of the layers is formed from the same polyester polyol with the medial or central layer being reticulated, and each layer has coincident side edges.

Having, thus, described the invention what is claimed is:

1. A flexible sponge comprising:
   (a) a flexible foam upper layer having a first side edge, the first side edge being serrated and a second side edge opposed to the first side edge, the second side edge comprising a plurality of convex arcuate lobes, the upper layer being a flexible foam material,
   (b) a reticulated foam material intermediate layer having a first serrated side edge and an opposed second side edge, the second side edge comprising a plurality of convex arcuate lobes, (c) a flexible foam lower layer having a first serrated side edge and having an opposed second side edge, the second side edge comprising a plurality of convex arcuate lobes, and wherein the three layers are bonded together such that the serrated side edges are coincident and the convex arcuate lobes on the second side edges are coincident.

2. The sponge of claim 1 wherein the upper layer and lower layer are each formed from a polyester polyol-based polyurethane.

3. The sponge of claim 2 wherein:
the central layer comprises a reticulated polyester polyol-based polyurethane.

4. The sponge of claim 3 wherein:
the polyester polyol-based polyurethane is the same for the upper, medial and lower layers.

5. The sponge of claim 4 wherein:
the layers are bonded together with an adhesive.

\* \* \* \* \*